July 21, 1970  S. M. STRAND  3,521,529
CYCLICALLY OPERATING MATERIAL CUT-OFF APPARATUS
WITH ADJUSTABLE SPEED AND POSITION CONTROL
Filed June 17, 1968  2 Sheets-Sheet 1

Inventor
Sanford M. Strand
By H R Rather
Attorney

July 21, 1970  S. M. STRAND  3,521,529
CYCLICALLY OPERATING MATERIAL CUT-OFF APPARATUS
WITH ADJUSTABLE SPEED AND POSITION CONTROL
Filed June 17, 1968  2 Sheets-Sheet 2

Fig. 2a

| SWITCH A | | | | |
|---|---|---|---|---|
| CUT SET | 1 | 2 | 3 | 4 |
| 90 | X | X | X | X |
| 80 | X | X | O | X |
| 70 | X | O | X | X |
| 60 | X | O | X | O |
| 50 | X | O | O | O |
| 40 | O | X | X | X |
| 30 | O | X | O | X |
| 20 | O | X | O | O |
| 10 | O | O | X | O |
| 0 | O | O | O | O |

Fig. 2b

| SWITCH B | | | | |
|---|---|---|---|---|
| CUT SET | 1 | 2 | 3 | 4 |
| 9 | X | X | X | X |
| 8 | X | X | O | X |
| 7 | X | O | X | X |
| 6 | X | O | X | O |
| 5 | X | O | O | O |
| 4 | O | X | X | X |
| 3 | O | X | O | X |
| 2 | O | X | O | O |
| 1 | O | O | X | O |
| 0 | O | O | O | O |

Fig. 2c

| SWITCH C | | | | |
|---|---|---|---|---|
| CUT SET | 1 | 2 | 3 | 4 |
| .9 | X | X | X | X |
| .8 | X | X | O | X |
| .7 | X | O | X | X |
| .6 | X | O | X | O |
| .5 | X | O | O | O |
| .4 | O | X | X | X |
| .3 | O | X | O | X |
| .2 | O | X | O | O |
| .1 | O | O | X | O |
| .0 | O | O | O | O |

X = CLOSED
O = OPEN

Fig. 3

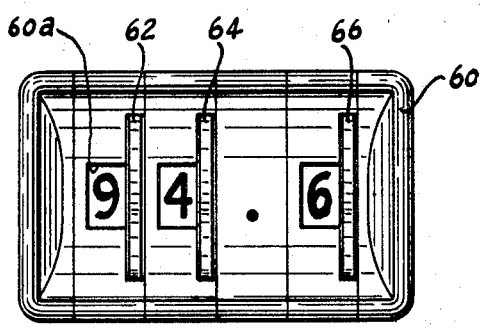

Inventor
Sanford M. Strand
By H R Rather
Attorney

United States Patent Office 3,521,529
Patented July 21, 1970

3,521,529
CYCLICALLY OPERATING MATERIAL CUT-OFF APPARATUS WITH ADJUSTABLE SPEED AND POSITION CONTROL
Sanford M. Strand, Milwaukee, Wis., assignor to Cutler-Hammer Inc., Milwaukee, Wis., a corporation of Delaware
Filed June 17, 1968, Ser. No. 737,409
Int. Cl. B26d 5/40, 1/56
U.S. Cl. 83—76     6 Claims

ABSTRACT OF THE DISCLOSURE

An apparatus for selecting and closely controlling the length of individual pieces cut off from a continuously moving length of material. It comprises a continuously rotating electric motor driven cutter or knife and a known form of digital speed and position phase control system for continuously controlling the rotational speed and position or phase of the cutter in a desired relation to the linear rate of advance of the material toward and past the cutting station. A reference pulse generator feeds pulses to the control system at a rate in accordance with the linear rate of advance of the material, and a second feedback pulse generator feeds pulses to said control system at a rate in accordance with the rate of cutter or knife rotation. A known form of adjustable pulse deleter is interposed between the second generator and the control system, and according to selected adjustment thereof affords deletion of selected numbers of pulses produced by the latter. The control system functions to increase the desired rate of cutter or knife rotation in an inverse relation to the number of pulses deleted by the deleter to afford corresponding decrease in length of pieces cut off from the moving material. The pulse deleter can be provided with switches and circuits controlled thereby arranged so that selected switch settings will be indicated in terms of the desired numerical length of pieces to be cut.

BACKGROUND OF THE INVENTION

The use of cyclically operating cutters or knives for effecting repeating cut-off of pieces to desired lengths from a continuously moving indefinite length of material is well known. Often such apparatus operates by feeding a continuous length of material at a constant rate of speed underneath a rotating cutter or knife that provides a cut-off operation once each revolution. Adjustment and maintenance of the desired length of the cut-off pieces is usually obtained by providing variation in the speed of rotation of the cutter. This is done by placing a variable speed transmission between the rotating knife and the material feed mechanism.

The digital speed and position regulating motor control systems disclosed and claimed in the Strand et al. Pat. No. 3,331,006 and Strand Pat. No. 3,349,308 are admirably suited for use in controlling knife driving motors, as they inherently provide close and continuous speed and position matching between a speed reference and the controlled motor. Moreover, as described and claimed in the Strand Pat. No. 3,404,343, issued Oct. 1, 1968 for Adjustable Digital Pulse Deleters, these speed and position control systems can be easily and selectively adjusted to maintain any desired ratio of speeds between a reference speed and a desired speed by deletion of pulses between a pulse generator driven by the controlled motor.

Accordingly, the present invention is basically a unique adaptation of the features of the speed and position control system of the Strand Pat. No. 3,349,308, and the adjustable digital pulse deleter of the Strand Pat. No. 3,404,-343 to the specific problem of selecting and maintaining the desired length of pieces cut off from a continuously moving length of material by an electrical motor driven cutter or knife.

OBJECTS OF THE INVENTION

This invention relates to apparatus for presetting and controlling the length of pieces cut off from an indefinite length of continuously moving material.

It is a primary object of the invention to provide an apparatus of the foregoing type which is characterized by using a continuously rotating cutter or knife, and by continuously controlling the rate and phase or position of an electric driving motor therefor so that the speed and position of the latter is constantly and continuously matched to the rate of movement of the material toward the knife.

Another object is to provide a digital speed and position control system for the knife driving motor which inherently provides such constant and continuous speed and position matching to a high degree of accuracy.

A further object of the invention is to provide for readily and easily adjusting the system to provide any selected length, less than some predetermined maximum length for the cut-off pieces.

A still further object of the invention is to provide for digital selected length setting of the control system in terms of the numerical length units desired.

Other objects and advantages of the invention will hereinafter appear.

The accompanying drawings illustrate a preferred embodiment of the invention which will now be described in detail, it being understood that the embodiments illustrated are susceptible of modifications in respect of details without departing from the scope of the appended claims.

BRIEF DESCRIPTION OF THE DRAWING FIGURES

FIGS. 2a, 2b and 2c are schedules for operation of switches shown in FIG. 1; and FIG. 3 shows a preferred form for the switches shown in FIGS. 2a to 2c.

DETAILED DESCRIPTION

Figure 1:
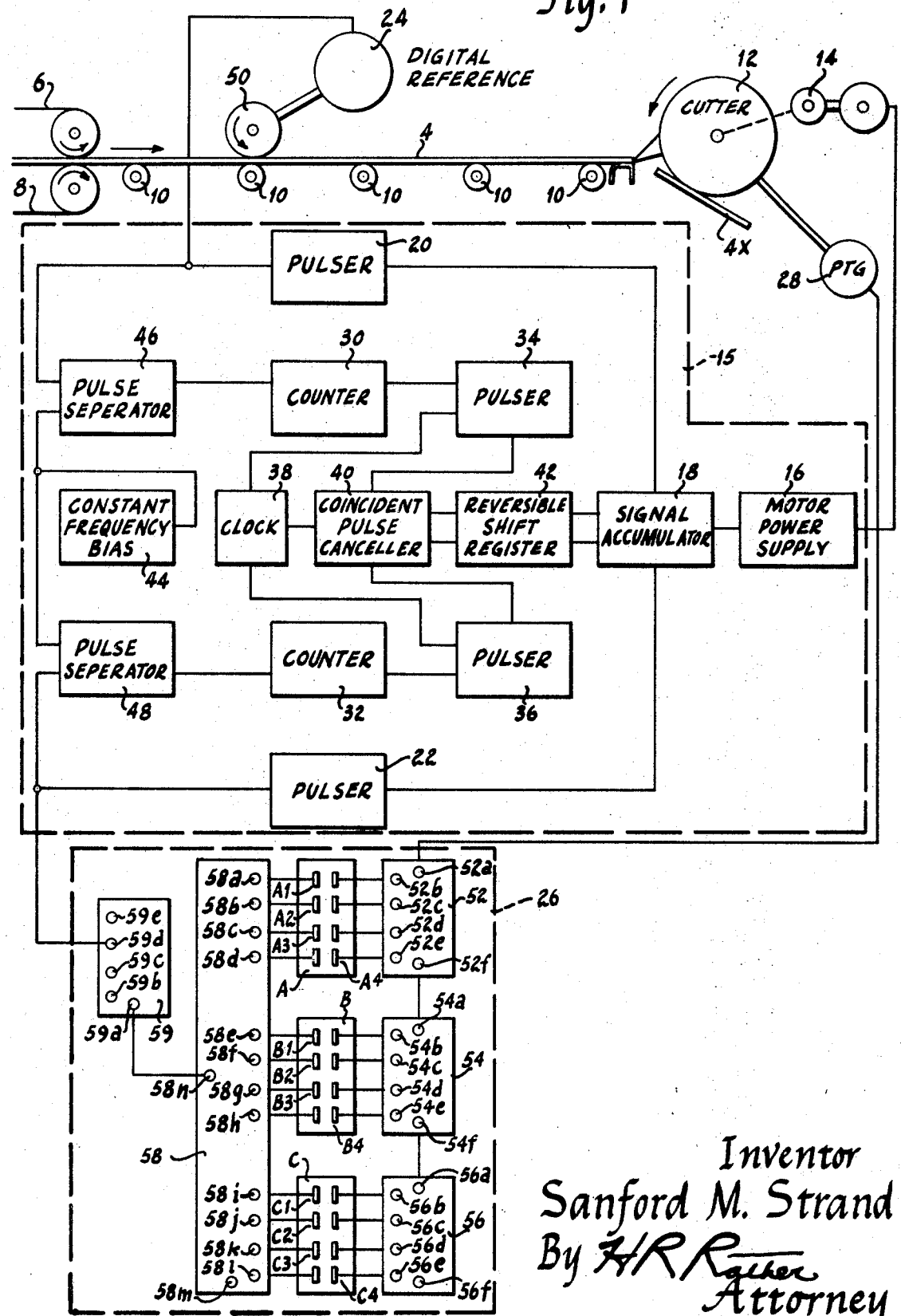
FIG. 1 is a schematic representation of a sheet cut-off mechanism and digital motor control system therefor incorporating the invention.

FIG. 1 discloses a cut-off mechanism which is operable to set and maintain the lengths of individual pieces cut from a continuous length of moving material to very close tolerances. The continuous length of material 4 may be assumed to be moving from left to right by a powered conveyor comprising sets of upper and lower endless belts 6 and 8, and moving over spaced rollers 10 to a rotating knife 12 which is driven by a D.C. motor 14.

The motor 14 is provided with a digital motor speed and position control system which is substantially that disclosed and claimed in the Strand Pat. No. 3,349,308. Reference should also be made to the Strand et al. Pat. No. 3,331,006 for certain details of that control system.

The portion of the control system enclosed in the dotted line rectangle 15 corresponds closely to that of the aforementioned Strand Pat. No. 3,349,308. It includes a power supply 16 which is connected to motor 14 to supply it with armature voltage which is regulable in magnitude. Power supply 16 is in turn controlled by an analog control voltage from a summer-integrator or signal accumulator 18.

Signal accumulator 18 is supplied with input pulses of predetermined amplitude and time period width but varying in frequency from each of the pulsers 20 and 22. The output frequency of pulses from pulser 20 is determined by input pulses supplied to it from a digital pulse generator 24. The frequency of output pulses from pulser 22 is determined by input pulses supplied to it by a pulse deleter 26 which is in turn supplied with input pulses from a digital pulse generator 28 driven from the rotating knife 12.

The control system further comprises counters 30 and 32, pulsers or pulse-drivers 34 and 36, a synchronous clock 38, a coincident pulse canceller 40 and a phase displacement signal generator or reversible shift register 42. Counter 30 is supplied with input pulses from pulse generator 24 and a constant frequency pulse generator 44. The pulses from generators 24 and 44 are fed intermediately to a pulse separator 46 which insures that all pulses generated by generators 24 and 44 are fed to counter 30 regardless of their coincidence or near coincidence in point of time. Counter 32 is supplied with input pulses from adjustable pulse deleter 26 and pulse generator 44 which are fed intermediately to counter 32 through a pulse separator 48 like pulse separator 46.

Pulse generator 24 is driven by a suitable wheel 50 which engages the upper surface of the material 4. The wheel 50 in one preferred form has a peripheral surface which engages with and is driven in a counterclockwise direction by the advancing material 4 as depicted in FIG. 1. With wheel 50 chosen to have a circumference of 2 feet, and generator 24 chosen to provide 240 pulses per revolution of its driving shaft, then 120 pulses will be provided for each foot of movement of the material 4. In other words, for each inch of movement of material 4 generator 24 will provide 10 pulses, and for each $\frac{1}{10}$ inch of such material movement 1 pulse.

A pulse generator 28 driven by the shaft of cutter 12 may be assumed to provide 10,000 output pulses per revolution.

Adjustable pulse deleter 26 comprises interconnected decade counters 52, 54 and 56 which are respectively connected to a pulser-scaler 58 by switch units A, B and C and a pulse dividing decade counter 59. Counters 52, 54 and 56 may be assumed to provide output pulses at their respective five output terminals in a binary coded decimal sequence for each 10 input pulses. Thus for every 1000 input pulses to its input terminal 52a counter 52 will provide a series of 900 output pulses at its output terminals 52b through 52e, and 100 output pulses at its output terminal 52f. For each 100 input pulses fed from output terminal 52f to input terminal 54a of counter 54, a series of 90 output pulses will appear in a binary coded decimal sequence at output terminals 54b through 54e and 10 pulses will appear at output terminal 54f. Also for each series of 10 output pulses fed from output terminal 54f to input terminal 56a of counter 56, a series of 10 output pulses in a binary coded decimal sequence will appear at output terminals 56b through 56f.

Each of the switch units A, B and C is depicted as having separate switches connected between a pair of their output terminals and input terminals of pulser-scaler 58. As shown in the schedule of FIG. 2a if all the switches A1 to A4 of switch unit A are closed, all 900 pulses developed at terminals 52b through 52e will be fed into pulser-scaler 58. By selective closure and opening of the switches A1 to A4 lesser numbers of pulses of decrements of 100 pulses can be fed into pulser-scaler 58. It will be apparent from the schedule of FIG. 2b that with all switches B1 to B4 closed that all 90 pulses developed at terminals 54b through 54e will be fed into pulser-scaler 58, and a lesser number may be fed in decrements of 10 by selective closure and opening of the switches B1 to B4 as depicted. Further, it will be apparent from the schedule of FIG. 2c that with all switches C1 to C4 closed that 9 pulses developed at terminals 56a through 56e of decade 56 will be fed into pulser-scaler 58. By selective closure and opening of switches C1 to C4 as indicated in schedule FIG. 2c, lesser numbers of pulses in decrements of single pulses between 9 and 0 will be fed into pulser-scaler 58.

Pulser-scaler 58 has twelve input terminals 58a to $58^1$ and a single output terminal 58n It may be assumed that for any input pulse fed into terminals 58a to $58^1$ an output pulse will be developed at output terminal 58n. Accordingly, it will be seen that if all the individual switches of switch units A, B and C are closed for each series of 10,000 pulses fed into input terminal 52a of decade 52, 9,999 pulses will be developed at output terminal 58n. If it is desired that a lesser number of pulses be developed at output terminal 58n for each 10,000 fed into input terminal 52a, then this can be accomplished in any number between 10 and 9,999 in decrements of one thousand, one hundred, or ten pulses and in any combinations thereof by appropriate closure and opening of switches as indicated in the schedules of FIGS. 2a to 2c. For example, if it is desired to delete 4,350 pulses out of each series of 10,000, or develop 10,000—4,350 or 5,650 pulses per 10,000 input pulses switches A1, B1, B3 and C1 would be closed and all others opened. This principle of providing direct digital length measurements for cutoffs by means of pulse deletions from the feedback circuit, where knife speed is controlled proportional to some ratio of the continuously moving material speed is considered unique in this application.

Due to the presence of decade counter 59, the final or resultant pulse rate is stepped down by a fixed factor of ten. Thus in the above example of selected pulse deletion while 5,650 pulses will appear at output terminal 58n of pulser-scaler 58 for every 10,000 input pulses at input terminal 52a of decade counter 52 only 565 pulses will appear at terminal 59d of decade counter 59. As will be understood effecting digital pulse deletion at ten times normal frequency and then reducing the resultant by a factor of ten reduces the effect of each pulse deletion in the resultant train of pulses occurring at output terminal 59d. Thus the effect of each pulse deletion in the regulating action of control system 15 will be correspondingly reduced thereby enhancing the regulating accuracy of the control system. Higher frequency rates of pulse generation for generator 28 can, of course, be used if greater control system regulating accuracy is needed.

Pulse deleter 26, except for the addition of decade counter 59, is exactly the same in construction and function as a form disclosed and claimed in the aforementioned Strand Pat. No. 3,404,343. Reference should be had to that application for a more complete understanding of pulse deleter 26.

At an assumed base speed of motor 14 knife 12 is driven one revolution for each 99.9 inches of advance of the material 4 toward the cutter. Pulse generator 28 produces 10,000 output pulses for each revolution of knife 12 and each 99.9 inches of advance of the material 4. During this same interval pulse generator 24 will produce 999 pulses and 999 pulses will be produced at output terminal 59d of counter 59. Under these conditions the digital speed and position control 15 will function to maintain the speed of motor 14 constant at a speed, and in phase or position step with the movement of the material 4, so that the length of pieces 4X cut off each revolution of knife 12 will be maintained at 99.9 inches within very close tolerances.

Now let it be assumed that motor 14 is running at a slightly different speed such that the pulses produced at terminal 59d of counter 59 is greater or less than 1000 pulses for each 99.9 inches of advance of the material 4. The pulses per unit time fed to pulser 22 will then be greater or less in number than those fed to pulser 20 and thus the number of output pulses supplied to signal accumulator 18 from pulser 22 will be correspondingly greater or less per unit time than those fed to the former from pulser 22. Signal accumulator 18 will then provide an output to motor power supply 16 to cause the latter to reduce or increase the armature voltage to motor 14, and thereby cause speed-up or slowdown of motor 14 as may be required to bring it back in speed step with the rate of movement of the material 4.

The remainder of the control system 15 simultaneously functions as aforedescribed in the Strand Pat. No. 3,349,308 to maintain the rotation of knife 12 in phase or position step with the movement of the material 4. With a position phase error condition of motor 14 the duration width of the pulse at the output of counter 32 will be less or greater than the duration width of the output pulses at counter 30. Moreover, the time phase difference between the sets of output pulses for counters 30 and 32 will be in accordance with the angular position lead or lag between the drive shaft of pulse generator 28 and that of pulse generator 24. It will also be seen that this is also indicative of the phase lead or lag of rotation of knife 12 with respect to the rate of movement of material 4 during any interval.

The output pulses generated by counters 30 and 32 are fed into pulsers 34 and 36, respectively, to provide output pulses of the same amplitude and time duration width. These latter sets of pulses are both fed into a coincident pulse canceller 40 which permits the pulse from one of the last mentioned pulsers to pass through to the input of reversible shift register 42 if a preceding pulse from the other pulser precedes it in time by an amount greater than a given amount, say 100 microseconds. If the time phase between any successive pulses emanating alternately from the pulsers 34 and 36 is less than such given amount, both are effectively canceled, and do not pass through to shift register 42. Cancellation of coincident or near coincident pulses eliminates unnecessary operation of shift register 42.

Shift register 42 is a special form of reversible shift register which is disclosed in detail in the aforementioned Strand et al. Pat. No. 3,331,006. It comprises five information storage elements and a single information "bit" is shifted between such storage elements. The storage elements are so interconnected that the information "bit" can never be cleared out of the end storage elements, and under certain conditions of input pulses the "bit" stays in the end storage elements. As described in detail in the Strand et al. patent the storage elements of register 42 are provided with two sets of gates, one being excited by pulses emanating from pulser 34 and supplied to it from one output terminal of pulse canceller 40 to shift the information "bit" from left to right between storage elements. The other set of gates when excited by pulses emanating from pulser 36 and supplied to it from the other output terminal of pulse canceller 40 shifts the "bit" from right to left between storage elements.

As pulses emanating from generator 24 are interspersed between pulses emanating from terminal 59d of counter 59, the information "bit" circulates back and forth between adjacent storage elements. If the lead or lag is below a predetermined deviation limit the "bit" will stay in the center storage element. As the lead or lag exceeds such limit, but is below another upper limit, the "bit" circulates back and forth between the center element, and one of the storage elements immediately adjacent at either side thereof. When the "bit" is in one of the last mentioned storage elements a positive voltage of a predetermined magnitude is supplied to an input of signal accumulator 18, and when in the other a positive output voltage of a similar magnitude is supplied to another input of signal accumulator 18 having an opposite effect on the signal accumulator output compared with the first signal. The duration of the respective positive output voltages is dependent upon the time periods that the "bit" is in the storage elements to one side or the other of the center storage element. Such voltages are of pulse-like character, but are in effect analog quantities whose volt-second content are directly proportional to the amount of lead or lag between pulse generators 24 and 28.

When the lead or lag exceeds the aforementioned upper limit the "bit" sticks in one of the endmost storage elements. Because of the interposition of an "OR" logic circuit, the positive output voltage to the input of signal accumulator 18 will be continuous so long as the "bit" is in an endmost or immediately adjacent storage element.

It may be assumed that when the position phase of generator 28 is leading with respect to generator 24 by more than the aforementioned predetermined deviation limit that the positive voltage supplied from signal accumulator 18 will cause the output of motor power supply 16 voltage to be reduced to cause motor 14 to slow down to bring generator 28 in positive phase step with generator 24. Conversely, when the other output voltage is supplied to signal accumulator 18 with the position phase of generator 24 leading with respect to generator 28, the latter responds to cause the output voltage of power supply 16 to increase and cause drive motor 14 to speed-up.

The constant frequency generator 44, as described in the aforementioned Strand Pat. No. 3,349,308 insures that the reversible shift register 42 will operate at a frequency not less than that of the pulse rate frequency of generator 44. This insures that the motor phase displacement corrective action will be sufficiently rapid to prevent wide instantaneous departure from any desired speed. Under slow speed operating conditions, the pulse rates that generators 24 and 28 can provide might be so slow that under certain conditions, the corresponding rate of corrective action might permit wide instantaneous speed variations in motor. However, with the pulses from constant frequency generator 44 being added to those emanating from output terminal 59d of counter 59, and also to those emanating from generator 24, the rapidity of operation of reversible shift register 42 will always be sufficiently high to provide a satisfactory position correction signal.

If it is desired that pieces 4X cut off from the material 4 be some other length between 1 and 99.9 inches it is only necessary to appropriately set the switches of switch units A, B and C as aforedescribed. For example, if it is desired to have the length of the pieces 4X cut to 80.6 inches, switches A1, A2, A4, C1 and C3 should be closed and all other switches opened. With this pattern of switch operation deleter 26 will provide 806 pulses at its output terminal 59d of counter 59 for each series of 10,000 pulses generated by pulse generator 28. Consequently digital speed and position regulator 15 will function to proportionally increase the speed of motor 14, so that knife 12 will make one revolution for each 80.6 inches of advance of the material 4. When the motor 14 reaches and stabilizes at this higher speed it will be seen that the number of output pulses emanating from output terminal 59d for each 80.6 inches of advance of material 4 will equal the number produced by generator 24 for the same amount of material advance.

FIG. 3 shows the front panel 60 for three, so-called "thumb wheel" switches which have thumb wheel operators 62, 64 and 66, respectively. Each thumb wheel switch may be assumed to be of the type disclosed in the Huntress et al. Pat. No. 3,222,465, and that each such operator controls the commutation of four separate switches or switching circuits corresponding to the four switches in each of the switch units A, B and C of FIG. 1. Associated with each thumb wheel operator is a position indicating drum with numbers from "0" to "9" that appear in windows 60a in panel 60 to indicate each one of ten different switch commutation patterns provided.

The use of the three thumb wheel switches of FIG. 3 provides a convenient way of commutating the four switches of each of the switch units A, B and C of FIG. 1 in a binary coded decimal position sequence such as shown in the schedules of FIGS. 2a to 2c while indicating the switch positioning in terms of the desired length for the cut-off pieces. With the aforeassumed condition of 10,000 pulses generated by pulse generator 28 and 999 pulses generated by pulse generator 24 for each 99.9 inches of material advance, then any desired length for the cutoff pieces 4X can be dialed directly by appropriate position of the operators 62, 64 and 66 of the three thumb wheel switch units. For example, if it is desired to cut the pieces 4X to 65.8 inch lengths then operators 62, 64 and 66 would be operated to show indicated position of "65.8" in the windows 60a of panel 60.

It will be understood that the 999 and 10,000 output pulse relationship between pulse generators 24 and 28 for each 100 inches of material advance need not necessarily be adhered to. If the longest cut-off pieces to be handled are in excess of 100 inches other pulse ratios may be desirable if a direct indication in terms of piece length is desired in positioning the commutating switches of pulse deleter 26. Further, it will be understood that generator 24 could alternatively be driven by one of the powered rollers driving its conveyor belts 6 and 8 provided there is suitable gearing to afford the desired pulse generation per desired digital units of advance of the material 4. If it were desired to provide for handling a full 100 inches of cut-off lengths, this could be done in the embodiment of FIG. 1 by inserting an electrical connector and switch between output terminal 56f of decade counter 56 and input terminal 58m of pulser-scaler 58.

While in the preferred embodiment the pulse multiplication factor for generator 28 was selected as 10 and the pulse division factor for pulse counter 59 was selected as the same number 10, it will be understood that other multiplication and division factors can also be used. If a multiplication factor of N times normal is selected for the output pulse rate of generator 10, then the division factor selected for pulse counter 59 should be the same rational number N.

What is claimed is:

1. In an apparatus for controlling the length of pieces cut-off from a continuously moving length of material in combination:
  (a) an electric motor driven rotating cut-off device affording a cut-off operation each revolution;
  (b) means generating first pulses at a frequency in accordance with the rate of movement of the material;
  (c) means generating a given number of second pulses each revolution of said cut-off device;
  (d) means responsive to the pulses emanating from both of said pulse generating means to control the speed and position-phase of the motor driving said cut-off device in accordance with the ratio between said first and second pulses to provide a predetermined length for each cut-off piece each revolution of said cut-off device;
  (e) and means intermediate the last specified means and said means generating said second pulses for selectively deleting a number of said second pulses per revolution of said cut-off device to decrease the length of each cut-off piece in accordance with the number of said second pulses so deleted.

2. The combination according to claim 1, wherein said means generating said second pulses does so at a rate that is N times greater than the rate of pulses produced by said means producing said first pulses in the same interval, and wherein the last mentioned means includes a pulse divider for producing resultant output pulses at a rate equal to the rate of said second pulses minus the rate of pulse deletions in the same interval divided by N.

3. The combination according to claim 1, wherein said means responsive to said first and second pulses is of the digital type which continuously provides adjustment of the armature current supplied to the motor driving said cut-off device both in accordance with difference in numbers of pulses per unit time received from said first generating means and the last specified means, and in accordance with the time phase lead and lag between said first pulses and the output pulses from said last recited means.

4. The combination according to claim 1, wherein said last recited means comprises a pulse counter having an input terminal connected to said means generating said second pulses and a plurality of count output terminals, a pulser comprising a plurality of input terminals and a single output terminal connected to said means responsive to said second pulses, and means providing interconnection between counter output terminals and a like number of pulser input terminals and comprising switch means in one or more of said interconnections.

5. The combination according to claim 4, together with a pulse counter having its input terminal connected to the output terminal of said pulser and providing an output pulse at an output terminal for each successive series of a predetermined number of pulses appearing at its input terminal.

6. The combination according to claim 4, wherein said switch means are provided with position indicia and are arranged to be selectively positioned in accordance with the numercal units of length desired for the cut-off pieces of material.

References Cited

UNITED STATES PATENTS

| | | | |
|---|---|---|---|
| 3,244,863 | 4/1966 | Paterson | 83—76 X |
| 3,267,781 | 8/1966 | Sterns et al. | 83—76 X |

JAMES M. MEISTER, Primary Examiner

U.S. Cl. X.R.

83—311, 369, 522